US009751220B2

(12) United States Patent
Murphy et al.

(10) Patent No.: US 9,751,220 B2
(45) Date of Patent: Sep. 5, 2017

(54) FLEXURE BASED TORQUE SENSOR

(71) Applicant: Google Inc., Mountain View, CA (US)

(72) Inventors: Michael Patrick Murphy, Mountain View, CA (US); Donald Campbell, Mountain View, CA (US)

(73) Assignee: Google Inc., Mountain View, CA (US)

( * ) Notice: Subject to any disclaimer, the term of this patent is extended or adjusted under 35 U.S.C. 154(b) by 181 days.

(21) Appl. No.: 14/674,406

(22) Filed: Mar. 31, 2015

(65) Prior Publication Data

US 2016/0288338 A1    Oct. 6, 2016

(51) Int. Cl.
| | |
|---|---|
| *B25J 17/00* | (2006.01) |
| *B25J 17/02* | (2006.01) |
| *B25J 18/00* | (2006.01) |
| *B25J 19/02* | (2006.01) |
| *B25J 13/08* | (2006.01) |
| *G01L 3/04* | (2006.01) |
| *G01L 1/12* | (2006.01) |

(Continued)

(52) U.S. Cl.
CPC ............. *B25J 19/02* (2013.01); *B25J 9/0015* (2013.01); *B25J 13/085* (2013.01); *B25J 17/00* (2013.01); *G01L 1/122* (2013.01); *G01L 3/04* (2013.01); *G01L 3/1435* (2013.01); *Y10S 901/28* (2013.01); *Y10S 901/46* (2013.01)

(58) Field of Classification Search
CPC ........ B25J 13/085; B25J 19/02; B25J 9/0015; G01L 3/04; G01L 3/1435
See application file for complete search history.

(56) References Cited

U.S. PATENT DOCUMENTS 4,697,460 A * 10/1987 Sugiyama ............. G01L 3/1435
324/209
6,257,957 B1 * 7/2001 Murray ................ B23Q 1/5462
451/10

(Continued)

FOREIGN PATENT DOCUMENTS

EP        2532927 A2    12/2012

OTHER PUBLICATIONS

International Search Report and Written Opinion for corresponding PCT application serial No. PCT/US2016/023752 dated Jun. 13, 2016.

(Continued)

*Primary Examiner* — David M Fenstermacher
*Assistant Examiner* — Jake Cook
(74) *Attorney, Agent, or Firm* — McDonnell Boehnen Hulbert & Berghoff LLP

(57) ABSTRACT

An example device may include an annular flexure hub including a first stationary head, a second stationary head, a first rotatable head, and a second rotatable head. Each of the heads comprise an annular sector of the flexure hub, and the first and second stationary heads are interleaved between the first and second rotatable heads. The device may also include a stationary housing coupled to the first stationary head and the second stationary head of the flexure hub. The device may also include a first sensor positioned adjacent to the first rotatable head of the flexure hub, and a second sensor positioned adjacent to the second rotatable head of the flexure hub. The device may also include a rotatable housing coupled to the first rotatable head and the second rotatable head of the flexure hub.

20 Claims, 14 Drawing Sheets

(51) Int. Cl.
  *G01L 3/14* (2006.01)
  *B25J 9/00* (2006.01)

(56) References Cited

U.S. PATENT DOCUMENTS

| | | |
|---|---|---|
| 7,047,826 B2 | 5/2006 | Peshkin |
| 8,161,827 B2 | 4/2012 | Kato et al. |
| 8,798,793 B2 | 8/2014 | Lim et al. |
| 8,950,285 B2 | 2/2015 | Sim et al. |
| 2010/0005907 A1 | 1/2010 | Kato |
| 2013/0167661 A1 | 7/2013 | Nishioki |
| 2014/0045600 A1* | 2/2014 | Zhu .................. F16F 1/027 |
| | | 464/92 |
| 2014/0076656 A1 | 3/2014 | Tanaka |

OTHER PUBLICATIONS

Boer et al., "Multibody Modelling and Optimization of a Curved Hinge Flexure", The 1st Joint International Conference on Multibody System Dynamics (2010).
"Elastic Element Showing Low Stiffness Loss at Large Deflections", http://www.unwente.nl/ctw/wa/people/d.m._brouwer/2%20research/Flexure%20Mechanisms/curved%20hinge%20flexure/.
Ma et al., "Torque Measurement with Compliant Mechanisms", Journal of Mechanical Design, vol. 135 (2013).

* cited by examiner

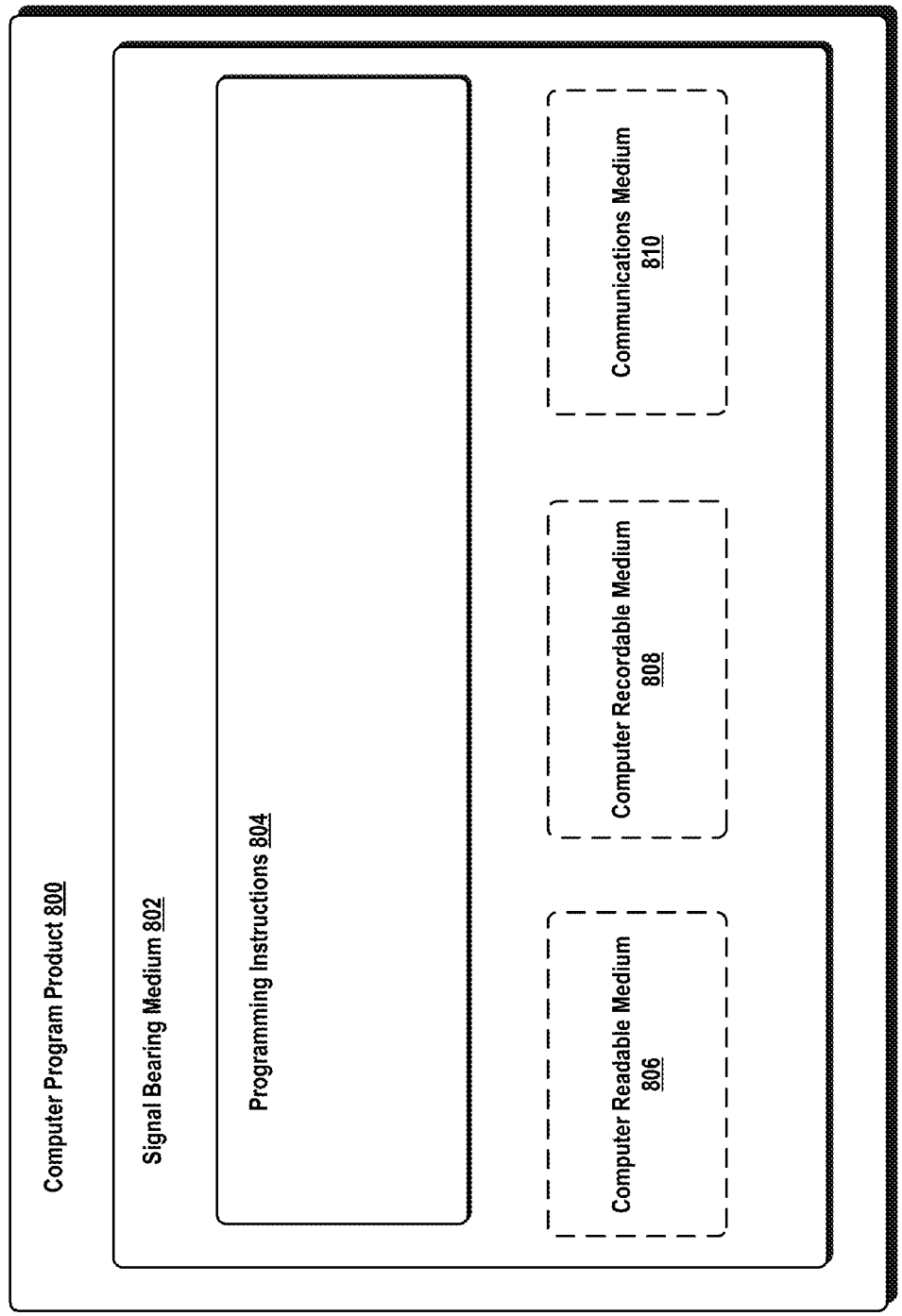

FLEXURE BASED TORQUE SENSOR

BACKGROUND

A robotic device may include a mechanical agent, usually an electro-mechanical machine, that is guided by a computer program or electronic circuitry. Robots can be autonomous or semi-autonomous and range from humanoid designs, to large industrial designs with jointed arms and end effectors to perform specialized tasks.

Such robotic devices may include several joints configured to enable the robotic device to perform a variety of functions and movements. For example, a humanoid robotic device may include knee joints, elbow joints, and finger joints. In some example operations, such joints of a robotic device may include a torque sensor to detect a torque on a given rotary joint.

SUMMARY

A first example implementation includes a device having (i) an annular flexure hub including a first stationary head, a second stationary head, a first rotatable head, and a second rotatable head, wherein each of the heads comprise an annular sector of the flexure hub, and wherein the first and second stationary heads are interleaved between the first and second rotatable heads, (ii) a stationary housing coupled to the first stationary head and the second stationary head of the flexure hub, (iii) a first sensor positioned adjacent to the first rotatable head of the flexure hub, (iv) a second sensor positioned adjacent to the second rotatable head of the flexure hub, and (v) a rotatable housing coupled to the first rotatable head and the second rotatable head of the flexure hub.

A second example implementation includes a robotic joint comprising (i) a first limb, (ii) a second limb, and (iii) a torque sensor, where the torque sensor includes (a) an annular flexure hub including a first stationary head, a second stationary head, a first rotatable head, and a second rotatable head, wherein each of the heads comprise an annular sector of the flexure hub, and wherein the first and second stationary heads are interleaved between the first and second rotatable heads, (b) a stationary housing coupled to the first stationary head and the second stationary head of the flexure hub, (c) a first sensor positioned adjacent to the first rotatable head of the flexure hub, (d) a second sensor positioned adjacent to the second rotatable head of the flexure hub, and (e) a rotatable housing coupled to the first rotatable head and the second rotatable head of the flexure hub.

A third example implementation includes a robotic device having (i) a body, (ii) one or more joints coupled to the body, wherein at least one of the one or more joints includes (a) a first limb, (b) a second limb, (c) a torque sensor, and (d) a controller. The torque sensor includes (i) an annular flexure hub including a first stationary head, a second stationary head, a first rotatable head, and a second rotatable head, wherein each of the heads comprise an annular sector of the flexure hub, and wherein the first and second stationary heads are interleaved between the first and second rotatable heads, (ii) a stationary housing coupled to the first stationary head and the second stationary head of the flexure hub, wherein the stationary housing is further coupled to the first limb, (iii) a first sensor positioned adjacent to the first rotatable head of the flexure hub, (iv) a second sensor positioned adjacent to the second rotatable head of the flexure hub, and (v) a rotatable housing coupled to the first rotatable head and the second rotatable head of the flexure hub, wherein the rotatable housing is further coupled to the second limb. The controller is programmable to (i) combine a first reading from the first sensor and a second reading from the second sensor to determine a torque on a given joint, and (ii) control a rotational input to the rotatable housing of the given joint based on the determined torque.

In a fourth example implementation, a system may include various means for carrying out each of the operations of any of the first, second, and/or third example implementations.

In still other examples, methods and computer program products including instructions executable by a device, or by one or more processors or other components of the device, to perform functions of the methods are provided. The methods may be executable for operating a robotic device, for example.

This summary and other descriptions and figures provided herein are intended to illustrate implementations by way of example only and numerous variations are possible. For instance, structural elements and process steps can be rearranged, combined, distributed, eliminated, or otherwise changed, while remaining within the scope of the implementations as claimed.

BRIEF DESCRIPTION OF THE DRAWINGS

FIG. 8 depicts a computer-readable medium configured according to an example implementation.

DETAILED DESCRIPTION

Figure 1:
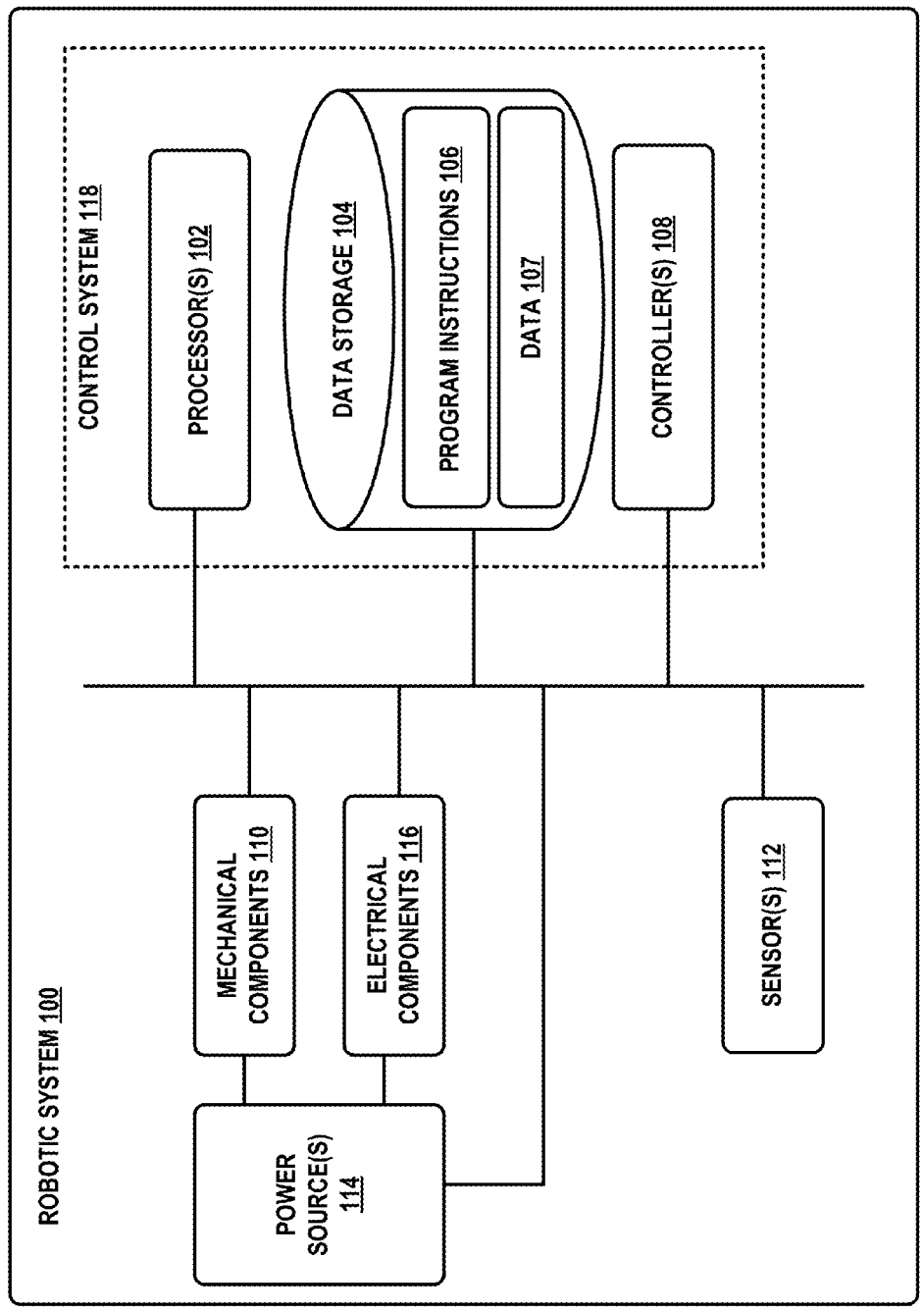
FIG. 1 illustrates a configuration of a robotic system, according to an example implementation.

Example apparatuses, systems and techniques are described herein. The words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. Thus, the aspects of the present disclosure, as generally described herein and illustrated in the figures, can be arranged, substituted, combined, separated, and designed in a wide variety of different configurations, all of which are contemplated herein. Further, unless otherwise noted, figures are not drawn to scale and are used for illustrative purposes only. Moreover, the figures are representational only and not all components are shown. For example, additional structural or restraining components might not be shown.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Overview

A robotic device may include several joints configured to enable the robotic device to perform a variety of functions and movements. For example, the robotic device may include hip joints, ankle joints, and/or wrist joints that permit two degrees-of-freedom (DOF). In some example operations, a torque sensor may be positioned on such joints to measure a torque between various components of the robotic device. Traditional torque sensors include a plurality of strain gauges. Strain gauges are thermally sensitive and are easily offset when components experience a torque overload. To address one or more of these current limitations of existing torque sensors, an example flexure based torque sensor is described herein. Such a flexure based torque sensor may be incorporated into a robotic device; however, the various implementations of flexure based torque sensors described herein may be standalone components that function without a corresponding robotic device.

An example device includes an annular flexure hub including a first stationary head, a second stationary head, a first rotatable head, and a second rotatable head. Each of the heads comprise an annular sector of the flexure hub. Further, the first and second stationary heads are one-by-one interleaved between the first and second rotatable heads. The device further includes a stationary housing coupled to the first stationary head and the second stationary head of the flexure hub. As such, the stationary housing prevents the first and second stationary heads from rotating. The device further includes a first sensor positioned adjacent to the first rotatable head of the flexure hub, and a second sensor positioned adjacent to the second rotatable head of the flexure hub. The device also includes a rotatable housing coupled to the first rotatable head and the second rotatable head of the flexure hub.

In operation, the rotatable housing is configured to rotate with respect to the stationary housing. As the rotatable housing rotates, the first rotatable head and second rotatable head rotate along with the rotatable housing as those components are coupled to the rotatable housing. The stationary housing, first stationary head and second stationary head remain stationary as the rotatable housing rotates. As the first rotatable head moves, the first sensor positioned adjacent to the first rotatable head detects the rotational movement of the first rotatable head. Similarly, as the second rotatable head moves, the second sensor positioned adjacent to the second rotatable head detects the rotational movement of the second rotatable head. The flexure based torque sensor may then combine the readings from both sensors to determine a torque on a given component, such as a joint of a robotic device.

It should be understood that the above examples are provided for illustrative purposes, and should not be construed as limiting. As such, the implementations herein may additionally or alternatively includes other features or includes fewer features, without departing from the scope of the invention.

II. Example Robotic Systems

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a biped robot, quadruped robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. The instance, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), and/or wheel(s). The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm or a leg to measure the load on the actuators that move one or more members of the arm or leg. As another example, the robotic system 100 may use one or more position sensors to sense the position of the actuators of the robotic system. For instance, such position sensors may sense states of extension, retraction, or rotation of the actuators on arms or legs.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicated discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, biped and quadruped implementations of the robotic system 100 are described below.

Figure 2:
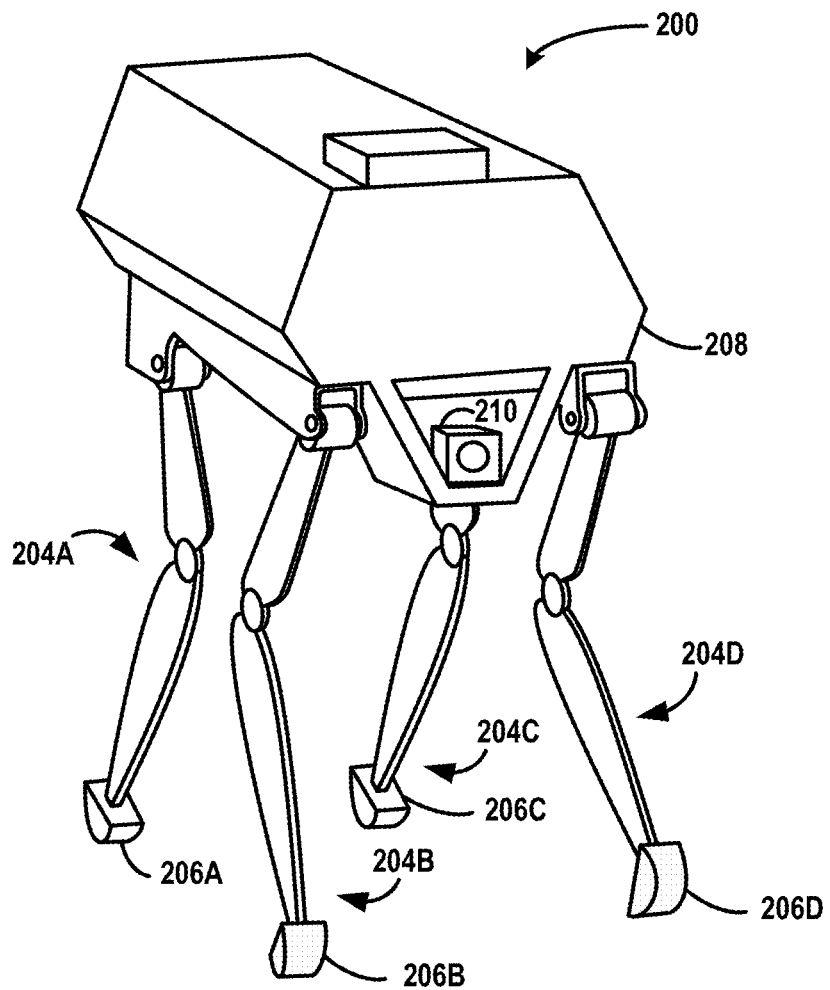
FIG. 2 illustrates a quadruped robotic device, according to an example implementation.

FIG. 2 illustrates a quadruped robot 200, according to an example implementation. Among other possible features, the robot 200 may be configured to perform some of the operations described herein. The robot 200 includes a control system, and legs 204A, 204B, 204C, 204D connected to a body 208. Each leg may include a respective foot 206A, 206B, 206C, 206D that may contact a surface (e.g., a ground surface). Further, the robot 200 is illustrated with sensor(s) 210, and may be capable of carrying a load on the body 208. Within other examples, the robot 200 may include more or fewer components, and thus may include components not shown in FIG. 2.

The robot 200 may be a physical representation of the robotic system 100 shown in FIG. 1, or may be based on other configurations. Thus, the robot 200 may include one or more of mechanical components 110, sensor(s) 112, power source(s) 114, electrical components 116, and/or control system 118, among other possible components or systems.

The configuration, position, and/or structure of the legs 204A-204D may vary in example implementations. The legs 204A-204D enable the robot 200 to move relative to its environment, and may be configured to operate in multiple degrees of freedom to enable different techniques of travel. In particular, the legs 204A-204D may enable the robot 200 to travel at various speeds according to the mechanics set forth within different gaits. The robot 200 may use one or more gaits to travel within an environment, which may involve selecting a gait based on speed, terrain, the need to maneuver, and/or energy efficiency.

Further, different types of robots may use different gaits due to variations in design. Although some gaits may have specific names (e.g., walk, trot, run, bound, gallop, etc.), the distinctions between gaits may overlap. The gaits may be classified based on footfall patterns—the locations on a surface for the placement the feet 206A-206D. Similarly, gaits may also be classified based on ambulatory mechanics.

The body 208 of the robot 200 connects to the legs 204A-204D and may house various components of the robot 200. For example, the body 208 may include or carry sensor(s) 210. These sensors may be any of the sensors discussed in the context of sensor(s) 112, such as a camera, LIDAR, or an infrared sensor. Further, the locations of sensor(s) 210 are not limited to those illustrated in FIG. 2. Thus, sensor(s) 210 may be positioned in various locations on the robot 200, such as on the body 208 and/or on one or more of the legs 204A-204D, among other examples.

Figure 3:
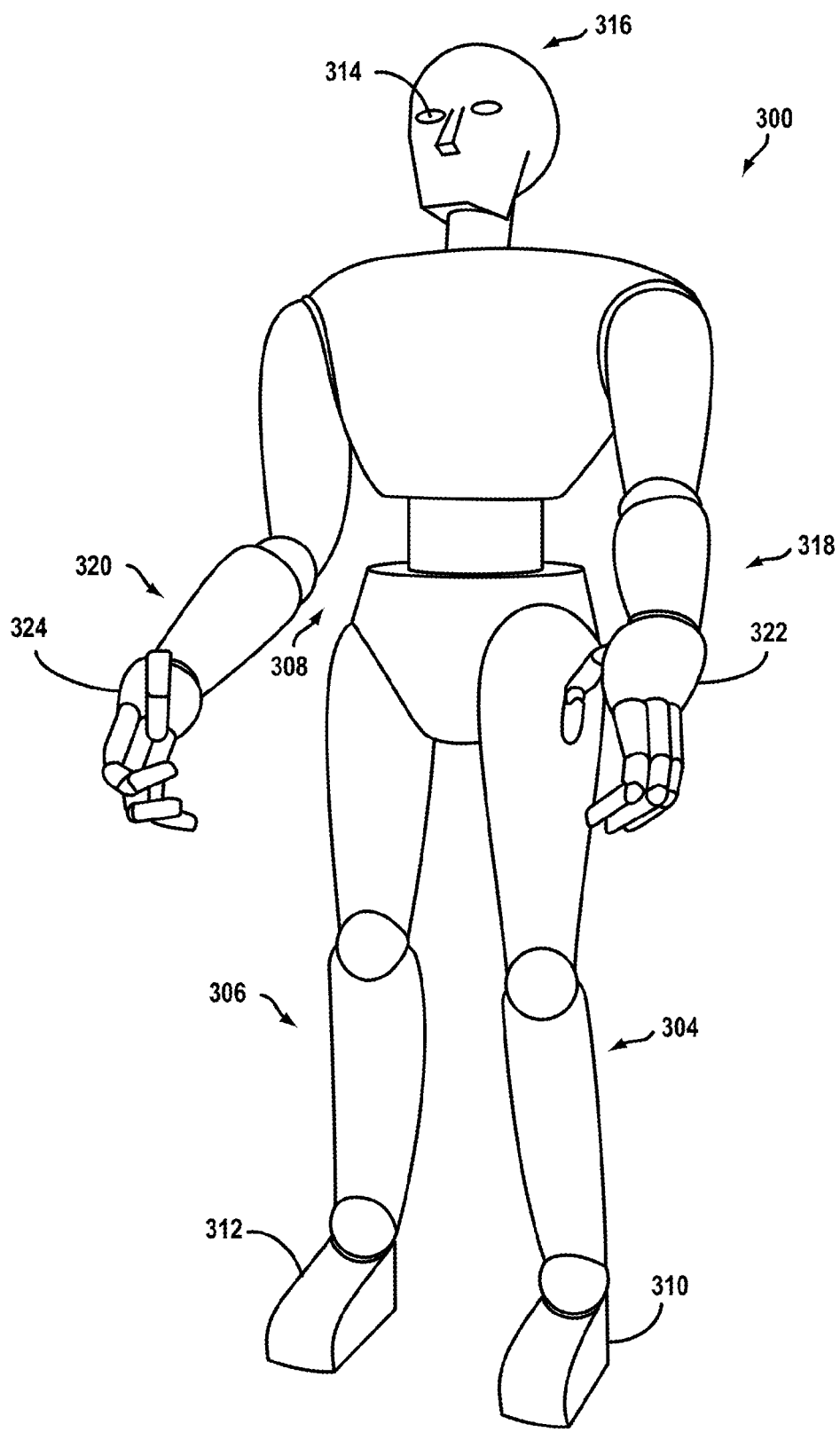
FIG. 3 illustrates a biped robotic device, according to an example implementation.

FIG. 3 illustrates a biped robot 300 according to another example implementation. Similar to robot 200, the robot 300 may correspond to the robotic system 100 shown in FIG. 1, and may be configured to perform some of the implementations described herein. Thus, like the robot 200, the robot 300 may include one or more of mechanical components 110, sensor(s) 112, power source(s) 114, electrical components 116, and/or control system 118.

For example, the robot 300 may include legs 304 and 306 connected to a body 308. Each leg may consist of one or more members connected by joints and configured to operate with various degrees of freedom with respect to one another. Each leg may also include a respective foot 310 and 312, which may contact a surface (e.g., the ground surface). Like the robot 200, the legs 304 and 306 may enable the robot 300 to travel at various speeds according to the mechanics set forth within gaits. The robot 300, however, may utilize different gaits from that of the robot 200, due at least in part to the differences between biped and quadruped capabilities.

The robot 300 may also include arms 318 and 320. These arms may facilitate object manipulation, load carrying, and/or balancing for the robot 300. Like legs 304 and 306, each arm may consist of one or more members connected by joints and configured to operate with various degrees of freedom with respect to one another. Each arm may also include a respective hand 322 and 324. The robot 300 may use hands 322 and 324 for gripping, turning, pulling, and/or pushing objects. The hands 322 and 324 may include various types of appendages or attachments, such as fingers, grippers, welding tools, cutting tools, and so on.

The robot 300 may also include sensor(s) 314, corresponding to sensor(s) 112, and configured to provide sensor data to its control system. In some cases, the locations of these sensors may be chosen in order to suggest an anthropomorphic structure of the robot 300. Thus, as illustrated in FIG. 3, the robot 300 may contain vision sensors (e.g., cameras, infrared sensors, object sensors, range sensors, etc.) within its head 316.

III. Example Flexure Based Torque Sensors

As described above, example robotic devices may include several joints configured to enable the robotic device to perform a variety of functions and movements. For example, a robotic device may include knee joints, elbow joints, and finger joints. One or more of these joints may include a torque sensor to detect a torque between various components of the joints.

Figure 4A:
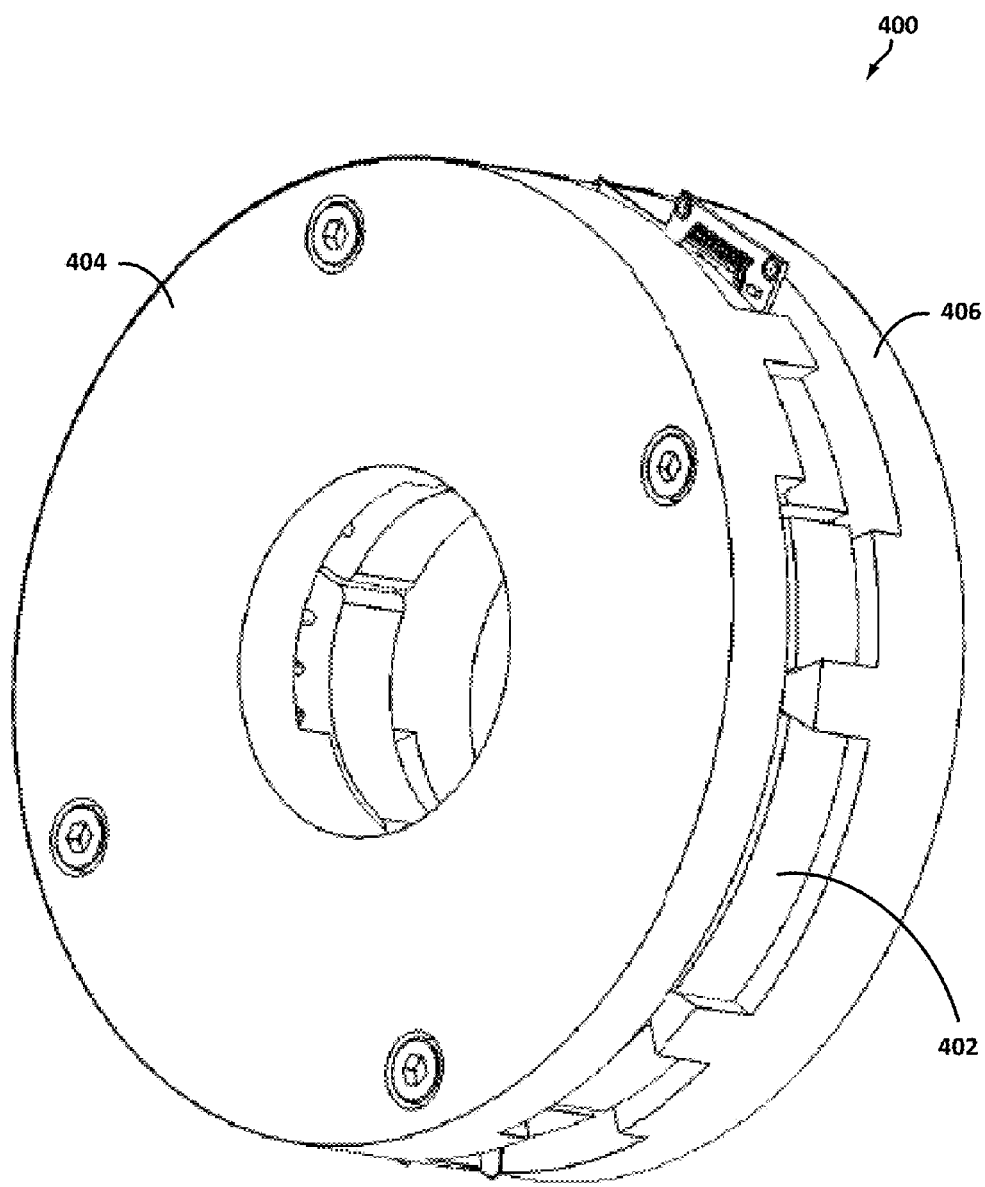
FIG. 4A illustrates a torque sensor, according to an example implementation.

FIG. 4A illustrates a torque sensor 400, according to an example implementation. As shown in FIG. 4A, the torque sensor 400 may include an annular flexure hub 402 positioned between a stationary housing 404 and a rotatable housing 406. The torque sensor 400 is configured to measure the torque as the rotatable housing 406 moves in relation to the stationary housing 404.

Figure 4B:
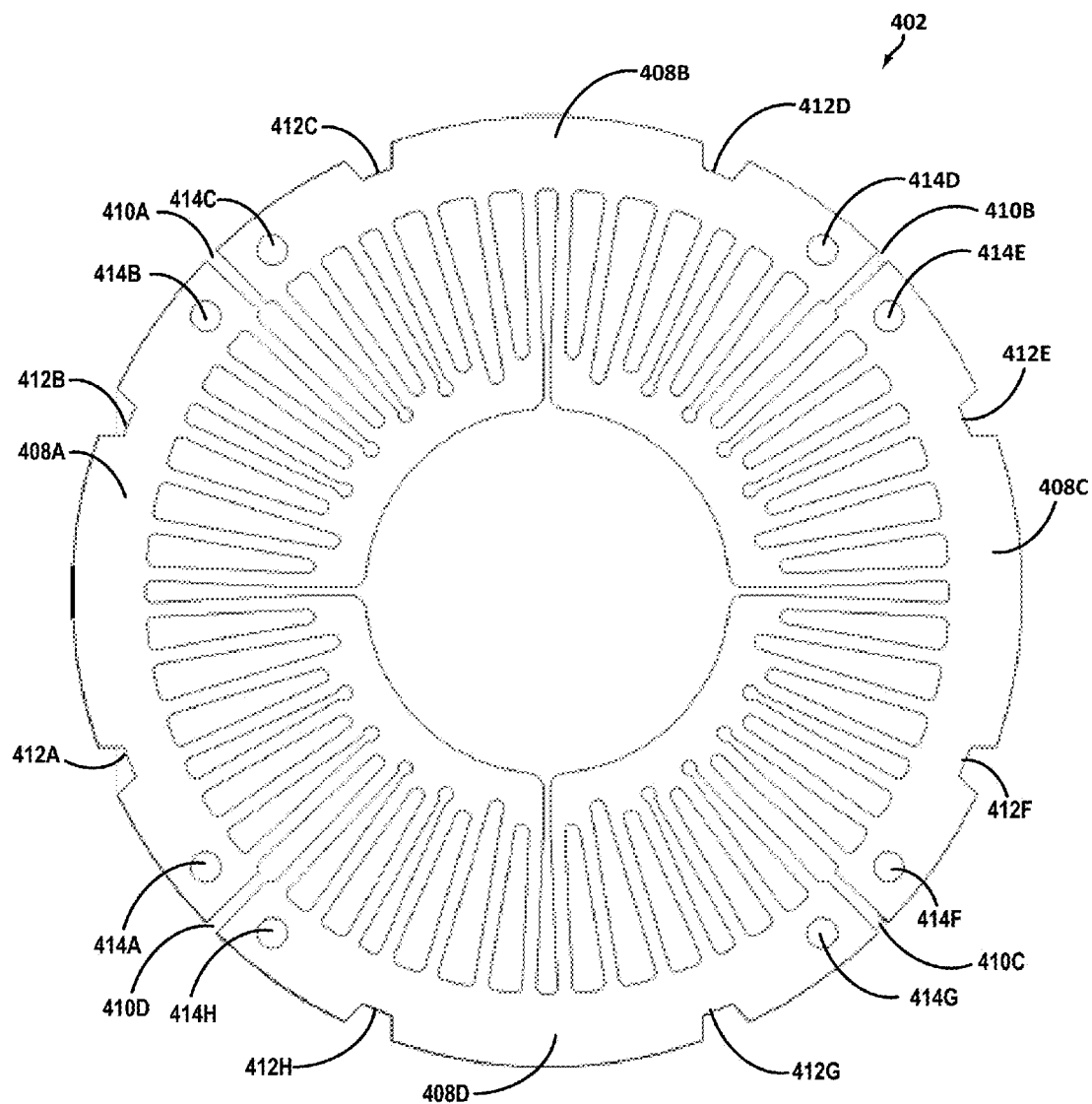
FIG. 4B illustrates an annular flexure hub of the torque sensor of FIG. 4A, according to an example implementation.

FIG. 4B illustrates the annular flexure hub 402 of the torque sensor 400, according to an example implementation. As shown in FIG. 4B, the flexure hub 402 may include a first stationary head 408A, a first rotatable head 408B, a second stationary head 408C, and a second rotatable head 408D. Each of the heads comprise an annular sector of the annular flexure hub 402, and the first stationary head 408A and second stationary head 408C are one-by-one interleaved between the first rotatable head 408B and the second rotatable head 408D. The flexure hub 402 may also include a first gap 410A between the first stationary head 408A and the first rotatable head 408B, a second gap 410B between the first rotatable head 408B and the second stationary head 408C, a third gap 410C between the second stationary head 408C and the second rotatable head 408D, and a fourth gap 410D between the second rotatable head 408D and the first stationary head 408A. The width of each of the first gap 410A, the second gap 410B, the third gap 410C, and the fourth gap 410D define a maximum rotation between the rotatable housing 406 and the stationary housing 402. Such a configuration provides an overload protected hard stop that may prevent excess strain on the system. As used herein, the term "stationary" defines the relative movement of a given component. For example, the stationary housing 404 is stationary relative to the rotatable housing 406. As such, the stationary housing 404 is an input to the torque sensor 400, and the rotatable housing 406 is an output. Similarly, each of the stationary heads 408A, 408C are stationary relative to each of the rotatable heads 408B, 408D. An actuator of an example robotic system may move the entire torque sensor 400, thereby causing the stationary components to move relative to other components of the robotic system. However, even during such movements the stationary components of the torque sensor 400 remain stationary with respect to the rotatable components of the torque sensor 400.

In one implementation, such as the example shown in FIG. 4B, each of the first stationary head 408A, the second stationary head 408C, the first rotatable head 408B, and the second rotatable head 408D include respective pluralities of spokes. However, in another implementation, each of the first stationary head 408A, the second stationary head 408C, the first rotatable head 408B, and the second rotatable head 408D are solid material and include no spokes.

The annular flexure hub 402 may further include a plurality of cutouts and through holes in each of the heads. As discussed in more detail below, the cutouts and through holes may be used to couple the annular flexure hub 402 to the stationary housing 404 and the rotatable housing 406. In one particular example, as shown in FIG. 4B, the first stationary head 408A may include a first cutout 412A, a first through hole 414A, a second cutout 412B, and a second through hole 414B. The first rotatable head 408B may include a third cutout 412C, a third through hole 414C, a fourth cutout 412D, and a fourth through hole 414D. The second stationary head 408C may include a fifth cutout 412E, a fifth through hole 414E, a sixth cutout 414F, and a sixth through hole 414F. Similarly, the second rotatable head 408D may include a seventh cutout 412G, a seventh through hole 414G, an eighth cutout 414H, and an eighth through hole 414H. In one example, each of the through holes 414A-414H may be threaded to receive a complementary threaded bolt.

Figure 4C:
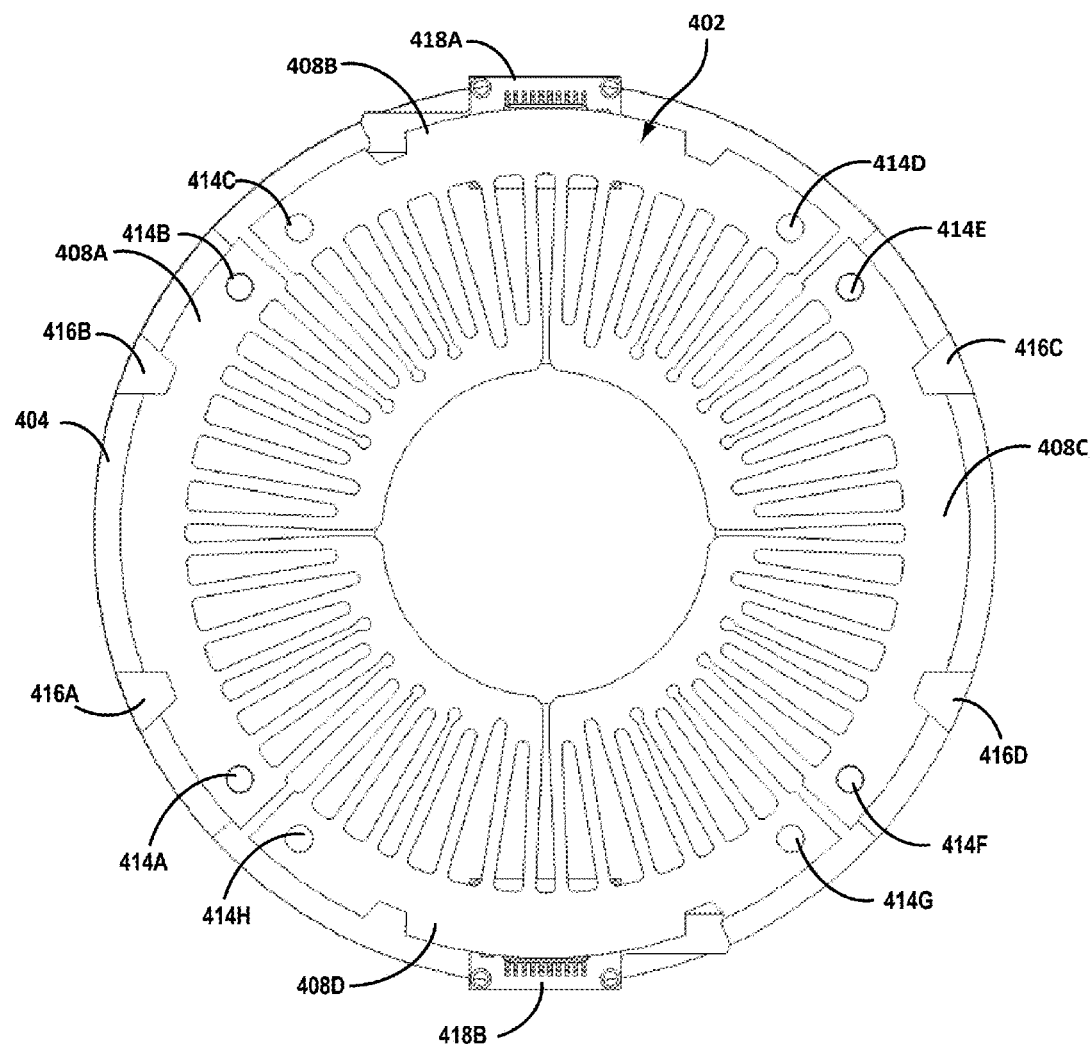
FIG. 4C illustrates a stationary housing coupled to the annular flexure hub of FIG. 4B, according to an example implementation.

FIG. 4C illustrates the stationary housing 404 coupled to the annular flexure hub 402, according to an example implementation. As shown in FIG. 4C, the stationary housing 404 is coupled to the first stationary head 408A and the second stationary head 408C of the annular flexure hub 402.

The stationary housing 404 may be coupled to the first stationary head 408A and the second stationary head 408C in a variety of ways. In one example, the first through hole 414A and second through hole 414B in the first stationary head 408A may each receive a bolt that couples the first stationary head 408A to the stationary housing 404. Similarly, the fifth through hole 414E and sixth through hole 414F in the second stationary head 408C may each receive a bolt that couples the second stationary head 408C to the stationary housing 404.

In another example, the stationary housing 404 may include a first protrusion 416A configured to fit within the first cutout 412A (shown in FIG. 4B), and a second protrusion 416B configured to fit within the second cutout 412B (shown in FIG. 4B). Similarly, the stationary housing 404 may include a third protrusion 416C configured to fit within the fifth cutout 412E (shown in FIG. 4B), and a fourth protrusion 416D configured to fit within the sixth cutout 412F (shown in FIG. 4B). Although the implementations shown in relation to FIGS. 4B and 4C include two cutouts and two complementary protrusions for each head of the flexure hub, a single cutout and single protrusion would be possible as well. In another example, more than two cutouts and two complementary protrusions for each head of the flexure hub are possible as well. In addition, the cutouts and protrusions shown in FIGS. 4B and 4C are trapezoidal in shape, but other shapes are possible as well. Further, other coupling mechanisms to couple the stationary housing 404 to the first stationary head 408A and second stationary head 408C may be used.

In addition, the torque sensor 400 includes a first sensor 418A positioned adjacent to the first rotatable head 408B, and a second sensor 418B positioned adjacent to the second rotatable head 408D. As shown in FIG. 4C, the sensors 418A, 418B may be positioned adjacent an outer surface of the flexure hub 402. Such a configuration enables the sensors 418A, 418B of the torque sensor 400 to detect the greatest displacement for every unit angle of rotation. In one example, the first sensor 418A and the second sensor 418B are linear displacement sensors. In another example, the first sensor 418A and the second sensor 418B are angular displacement sensors. As particular examples, the first sensor 418A and the second sensor 418B may be magnetoresistive (MR) sensors, fluxgate magnetometers, or Hall effect sensors. Other examples are possible as well.

The first sensor 418A and second sensor 418B each include a sensor target (such as a magnet), and a sensor component. In such an example, the sensor target may be positioned on the rotatable heads 408B, 408D, and the sensor component may be positioned on the stationary housing 404 adjacent the rotatable heads 408B, 408D. In another example, the sensor target may be positioned on the stationary housing 404, and the sensor component may be positioned on the rotatable heads 408B, 408D. In yet another example, the sensor target may be positioned on the stationary housing 404, and the sensor component may be positioned on the rotatable component 406 such that no sensor components are positioned on the flexure hub 402. In yet another example, a single sensor is positioned adjacent to one of the rotatable heads 408B, 408D. Other configurations are possible as well.

Figure 4D:
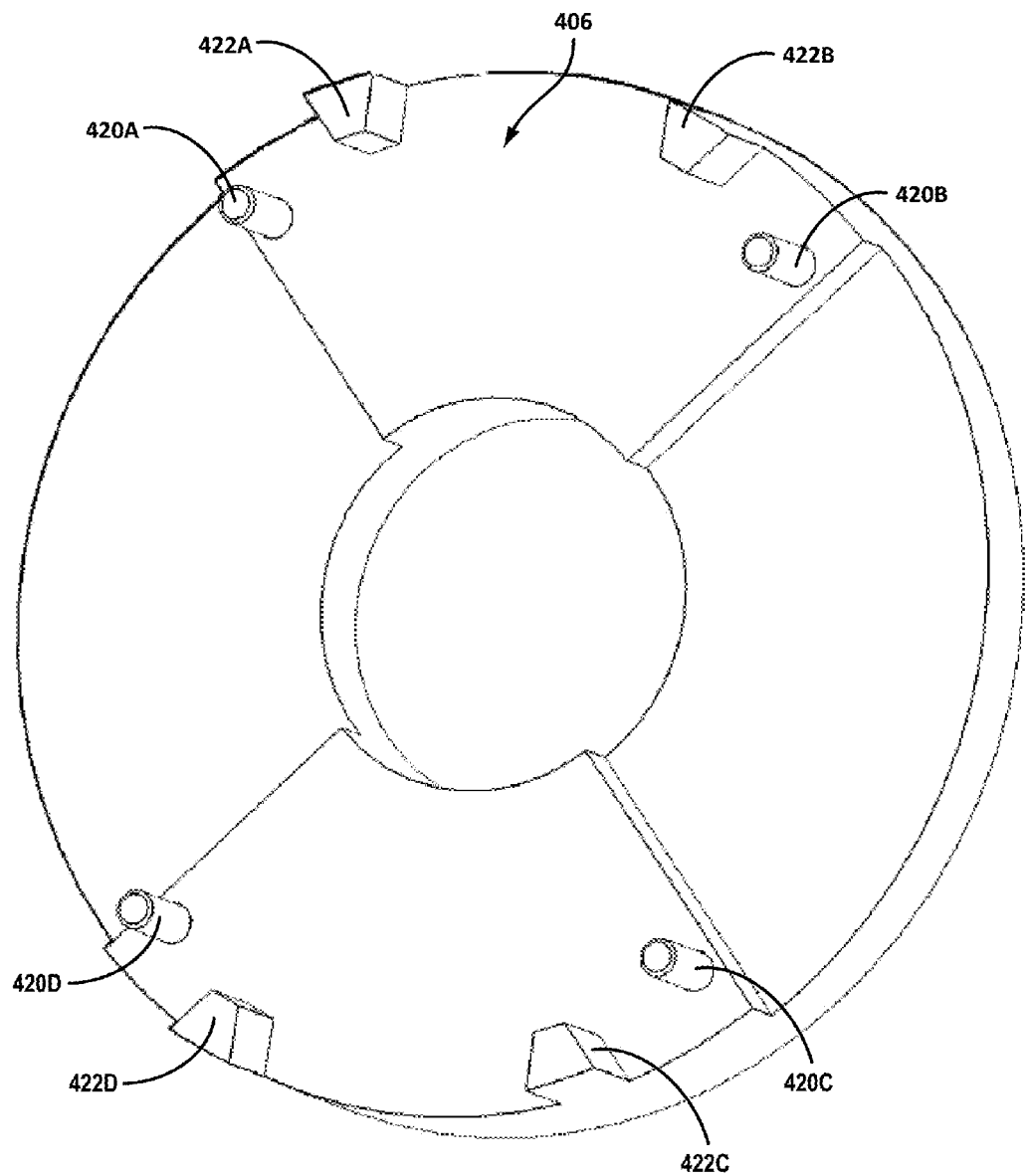
FIG. 4D illustrates a rotatable housing of the torque sensor of FIG. 4A, according to an example implementation.

FIG. 4D illustrates the rotatable housing 406 of the torque sensor 400, according to an example implementation. The rotatable housing 406 is coupled to the first rotatable head 408B and the second rotatable head 408D. The rotatable housing 406 may be coupled to the first rotatable head 408B and the second rotatable head 408D in a variety of ways. In one example, the third through hole 414C and fourth through hole 414D in the first rotatable head 408B may each receive a bolt 420A, 420B that couples the first rotatable head 408B to the rotatable housing 406. Similarly, the seventh through hole 414G and eighth through hole 414H in the second rotatable head 408D may each receive a bolt 420C, 420D that couples the second rotatable head 408D to the rotatable housing 406.

In another example, the rotatable housing 406 may include a first protrusion 422A configured to fit within the third cutout 412C, and a second protrusion 422B configured to fit within the fourth cutout 412D. Similarly, the rotatable housing 406 may include a third protrusion 422C configured to fit within the seventh cutout 412G, and a fourth protrusion 422D configured to fit within the eighth cutout 412H. Other coupling mechanisms to couple the rotatable housing 406 to the first rotatable head 408B and second rotatable head 408D are possible as well. For example, the cutouts may be on the rotatable housing, while the protrusions may be on the annular flexure hub. Other examples are possible as well.

In operation, the rotatable housing 406 is configured to rotate with respect to the stationary housing 404. As the rotatable housing 406 rotates, the first rotatable head 408B and second rotatable head 408D rotate along with the rotatable housing 406 as those components are coupled to the rotatable housing 406. The stationary housing 404, first stationary head 408A and second stationary head 408C remain stationary as the rotatable housing 406 rotates. If the rotatable housing 406 rotates in a clockwise direction, the first rotatable head 408B moves toward the second stationary head 408C. As such, the first gap 410A increases in size, while the second gap 410B decreases in size. At the same time, the second rotatable head 408D moves toward the first stationary head 408A. As such, the third gap 410C increases in size, while the second gap 410D decreases in size. As discussed above, the gaps between the stationary heads 408A, 408C and the rotatable heads 408B, 408D provide a hard stop that limits the amount of rotation of the flexure based torque sensor 400.

If the rotatable housing 406 rotates in a counterclockwise direction, the first rotatable head 408B moves toward the first stationary head 408A. As such, the first gap 410A decreases in size, while the second gap 410B increases in size. At the same time, the second rotatable head 408D moves toward the second stationary head 408B. As such, the third gap 410C decreases in size, while the second gap 410D increases in size.

As the first rotatable head 408B moves, the first sensor positioned adjacent to the first rotatable head 408B detects the rotational movement of the first rotatable head 408B. Similarly, as the second rotatable head 408D moves, the second sensor positioned adjacent to the second rotatable head 408D detects the rotational movement of the second rotatable head 408D. The torque sensor 400 may include or be coupled to a processor. Such a processor may be configured to combine a first reading from the first sensor 418A and a second reading from the second sensor 418B to determine a torque. For example, the processor may be configured to add the values from the first reading and the second reading to determine a combined reading. The processor may be further configured to divide the combined reading by the number of sensor readings to obtain a normalized torque. In the configuration shown in FIGS. 4A, 4B, 4C, and 4D, the processor may be configured to divide the combined reading by two (since there are two sensor readings from sensors 418A, 418B) to obtain the normalized torque. In such an example, the sensor data may cancel out movements that are unrelated to measuring torque. For example, by adding the values from the first reading and the second reading, lateral and vertical movements will be cancelled out so that only rotational movements are detected. Further, the first sensor 418A and second sensor 418B may be configured to ignore bending moments such that only rotational movements are detected by the sensors.

In one example, the torque sensor 400 may be positioned on a robotic joint, such as a knee joint, elbow joint, or finger joint, as examples. An example joint may include a first limb, a second limb, and the torque sensor 400. In such a configuration, the stationary housing 404 is coupled to the first limb, and the rotatable housing 406 is coupled to the second limb. As the first limb rotates with respect to the second limb, the torque sensor 400 determines a torque between the two limbs. Such a robotic joint may be in communication with a control system configured to control a rotational input to the rotatable housing 406 based on the determined torque on the device. In one example, the robotic joint may include an actuator coupled to the second limb, wherein the actuator provides the rotational input to the rotatable housing 406.

Figure 5A:
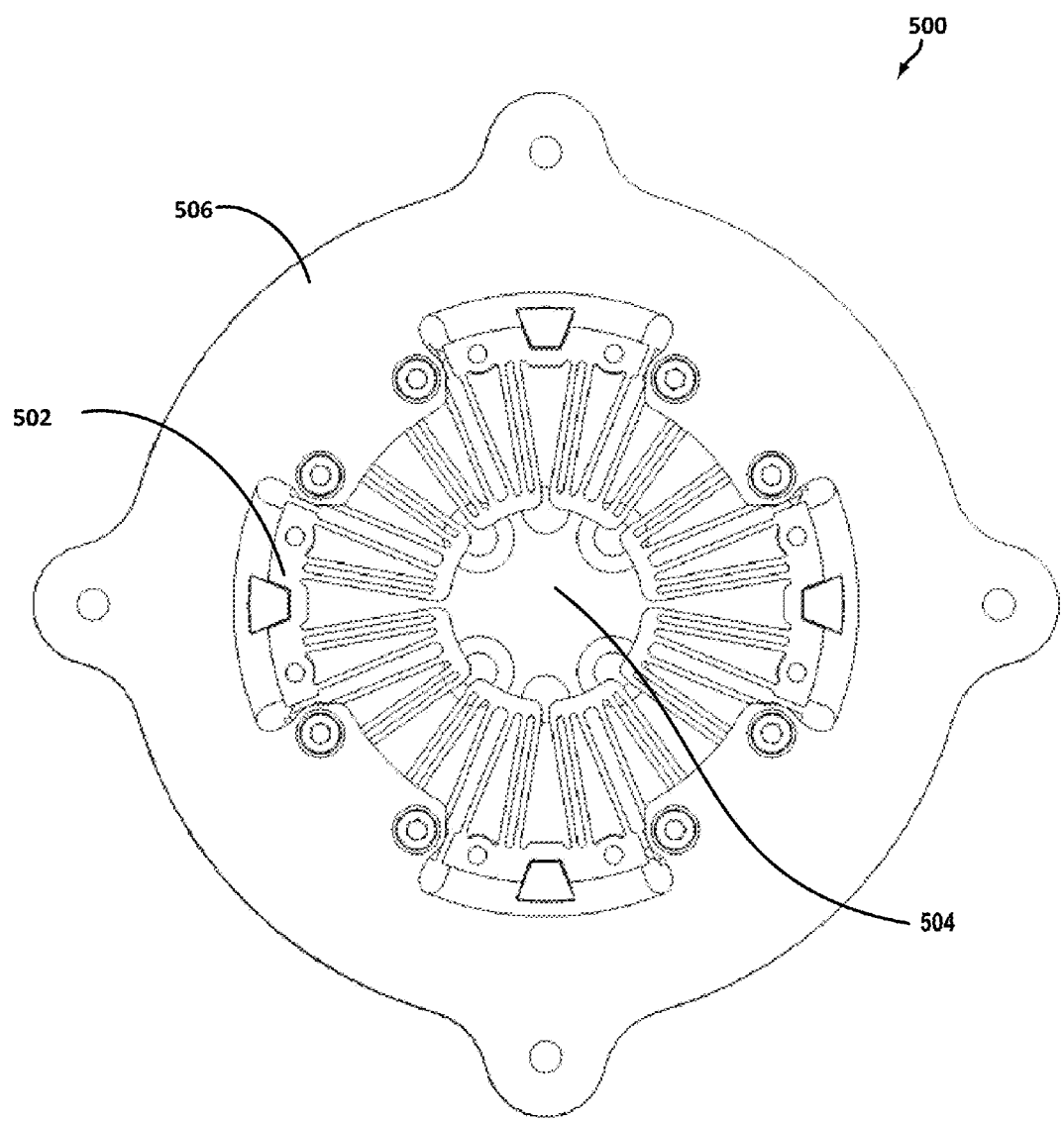
FIG. 5A illustrates another torque sensor, according to an example implementation.

FIG. 5A illustrates another torque sensor 500, according to an example implementation. As shown in FIG. 5A, the torque sensor 500 may include an annular flexure hub 502 positioned between a stationary housing 504 and a rotatable housing 506. The torque sensor 500 is configured to measure torque as the rotatable housing 506 moves in relation to the stationary housing 504.

Figure 5B:
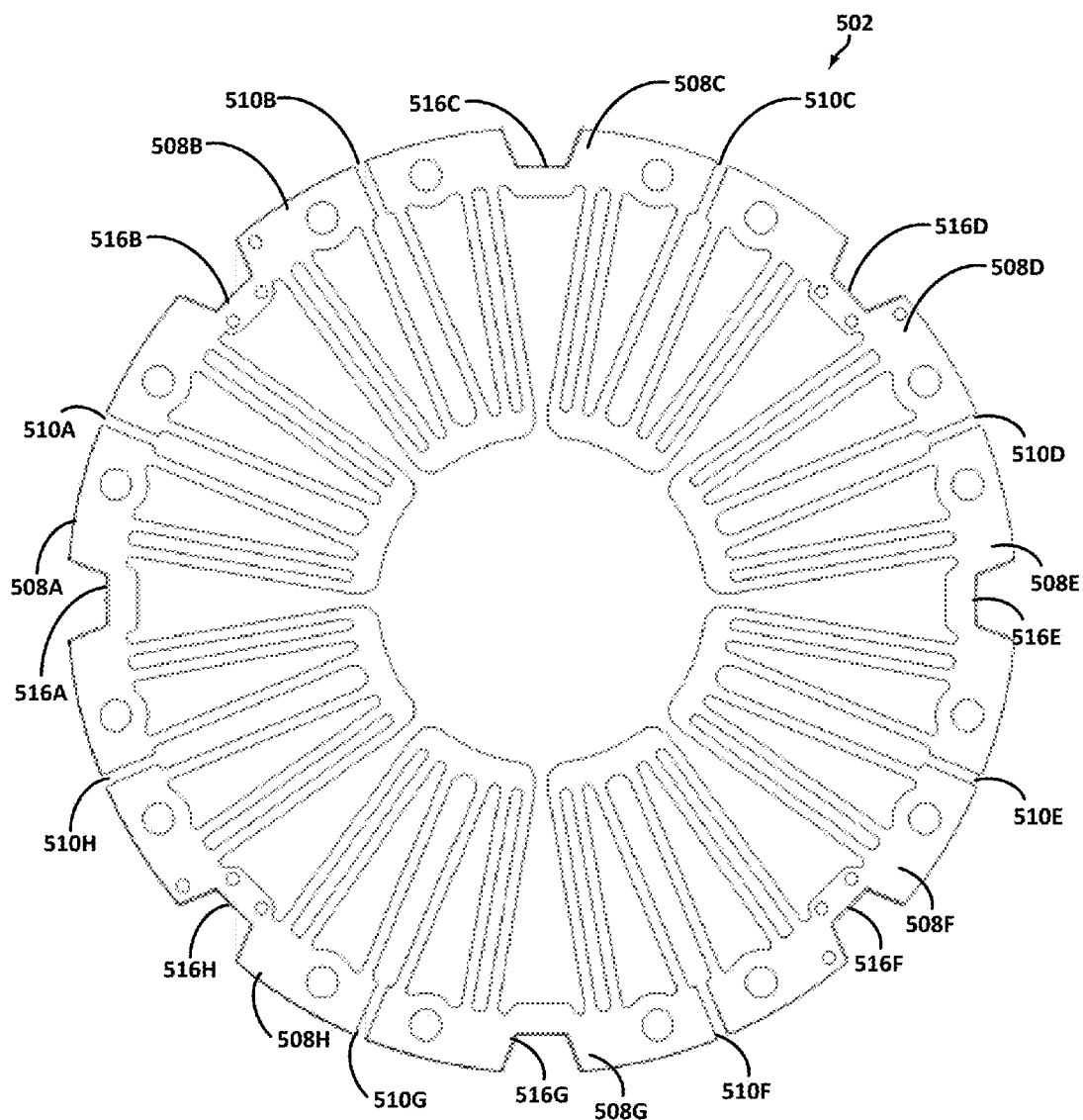
FIG. 5B illustrates an annular flexure hub of the torque sensor of FIG. 5A, according to an example implementation.

FIG. 5B illustrates the annular flexure hub 502 of the torque sensor 500, according to an example implementation. As shown in FIG. 5B, the flexure hub 502 may include a first stationary head 508A, a first rotatable head 508B, a second stationary head 508C, a second rotatable head 508D, a third stationary head 508E, a third rotatable head 508F, a fourth stationary head 508G, and a fourth rotatable head 508H. Each of the heads comprise an annular sector of the annular flexure hub 502, and the stationary heads 508A, 508C, 508E, and 508G are interleaved between the rotatable heads 508B, 508D, 508F, and 508H. The flexure hub 502 may also include a first gap 510A between the first stationary head 508A and the first rotatable head 508B, a second gap 510B between the first rotatable head 508B and the second stationary head 508C, a third gap 510C between the second stationary head 508C and the second rotatable head 508D, a fourth gap 510D between the second rotatable head 508D and the third stationary head 510E, a fifth gap 510E between the third stationary head 508E and the third rotatable head 508F, a sixth gap 510F between the third rotatable head 508F and the fourth stationary head 508G, a seventh gap 510G between the fourth stationary head 508G and the fourth rotatable head 508H, and an eighth gap 510H between the fourth rotatable head 508H and the first stationary head 508A. In one implementation, such as the example shown in FIG. 4B, each of heads 508A-508H include respective pluralities of spokes. However, in another implementation, each of the heads 508A-508H are solid material and include no spokes.

The annular flexure hub 502 may further include a plurality of cutouts and though holes in each of the heads, as illustrated in FIG. 5B. These configurations may be used to couple various components the flexure hub 502 to the stationary housing 504 and rotatable housing 506, as discussed above.

Figure 5C:
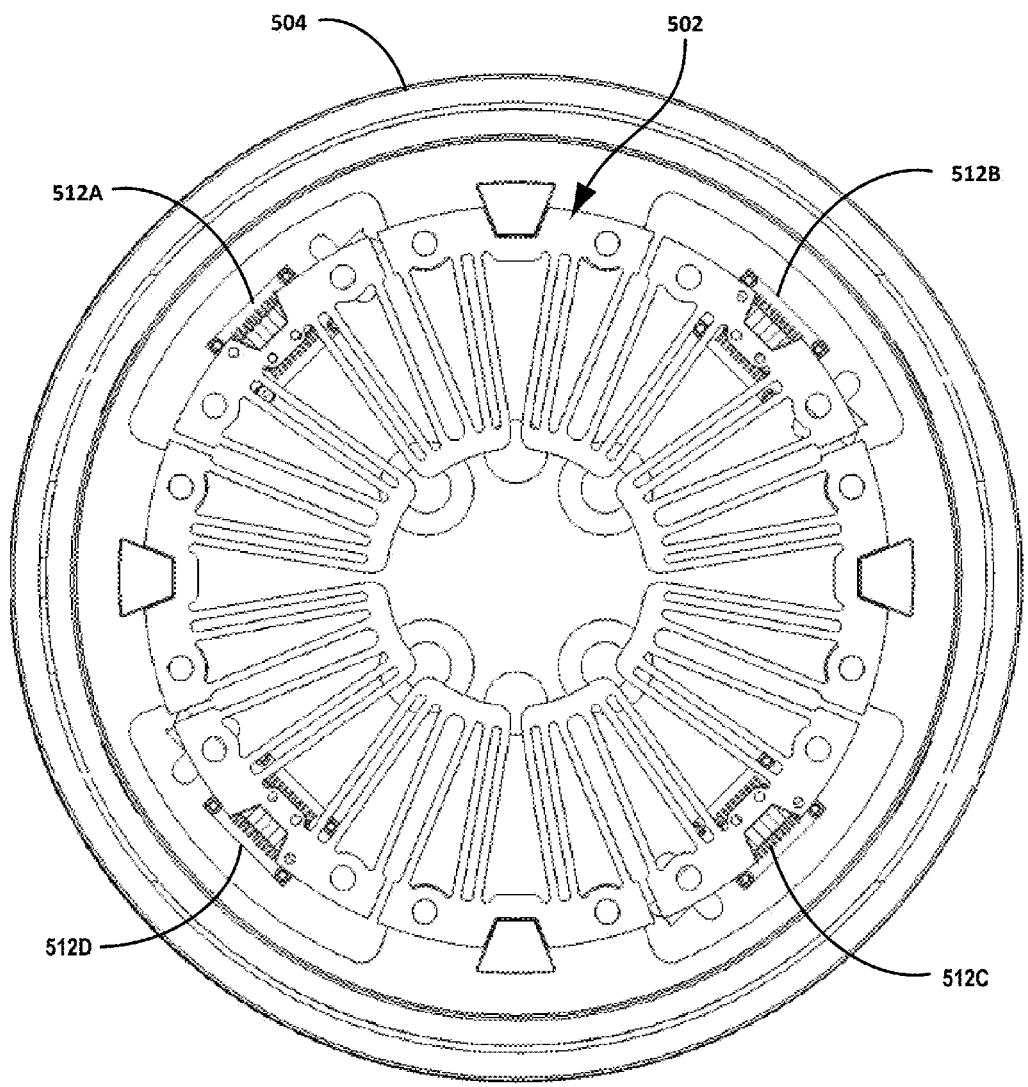
FIG. 5C illustrates a stationary housing coupled to the annular flexure hub of FIG. 5B, according to an example implementation.

FIG. 5C illustrates the stationary housing 504 coupled to the annular flexure hub 502, according to an example implementation. As shown in FIG. 5C, the stationary housing 504 is coupled to the first stationary head 508A, the second stationary head 508C, the third stationary head 508E, and the fourth stationary head 508G. The stationary housing 504 may be coupled to the stationary heads 508A, 508C, 508E, 508G in a variety of ways, as discussed above in relation to FIG. 4C.

The torque sensor 500 includes a first sensor 512A positioned adjacent to the first rotatable head 508B, a second sensor 512B positioned adjacent to the second rotatable head 508D, a third sensor 512C positioned adjacent to the third rotatable head 508F, and a fourth sensor 512D positioned adjacent to the fourth rotatable head 508H. As shown in FIG. 5C, the sensors 512A, 512B, 512C, and 512D may be positioned adjacent an outer surface of the flexure hub 502, as discussed above. The sensors 512A, 512B, 512C, and 512D may be linear displacement sensors, angular displacement sensors, MR sensors, fluxgate magnetometers, or Hall effect sensors, as examples. Other examples are possible as well. Further, the sensors 512A, 512B, 512C, and 512D may be positioned in a variety of ways on the various components of the torque sensor 500, as discussed above.

Figure 5D:
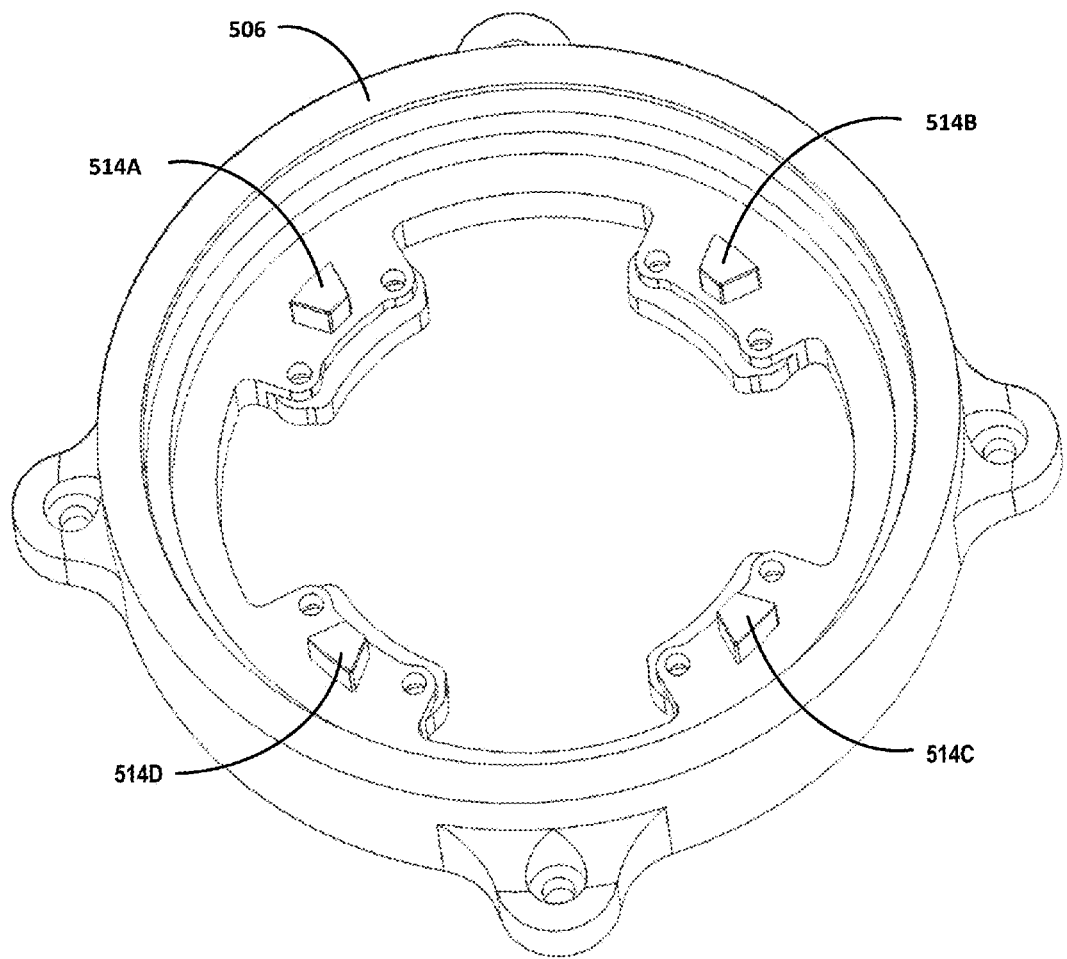
FIG. 5D illustrates a rotatable housing of the torque sensor of FIG. 5A, according to an example implementation.

FIG. 5D illustrates the rotatable housing 506 of the torque sensor 500, according to an example implementation. The rotatable housing 506 is coupled to the first rotatable head 508B, the second rotatable head 508D, the third rotatable head 508F, and the fourth rotatable head 508H. As discussed above in relation to FIG. 4D, the rotatable housing 506 may be coupled to the rotatable heads 508B, 508D, 508F, 508G in a variety of ways. In one example, the rotatable housing 506 may include a first protrusion 514A configured to fit within a corresponding cutout 516B in the first rotatable head 508B (shown in FIG. 5B), a second protrusion 514B configured to fit within a corresponding cutout 516D in the second rotatable head 508D (shown in FIG. 5B), a third protrusion 514C configured to fit within a corresponding cutout 516F in the third rotatable head 508F (shown in FIG. 5B), and a fourth protrusion 514D configured to fit within a corresponding cutout 516H in the fourth rotatable head 508H (shown in FIG. 5B). Other mechanisms for coupling the rotatable housing 506 to the rotatable heads 508B, 508D, 508F, 508G are possible as well.

In operation, the rotatable housing 506 is configured to rotate with respect to the stationary housing 504. As the rotatable housing 506 rotates, the first rotatable head 508B, second rotatable head 508D, third rotatable head 508F, and fourth rotatable head 508H rotate along with the rotatable housing 506 as those components are coupled to the rotatable housing 506. The stationary housing 504, first stationary head 508A, second stationary head 508C, third stationary head 508E, and fourth station head 508G remain stationary as the rotatable housing 506 rotates.

If the rotatable housing 506 rotates in a clockwise direction, the first rotatable head 508B moves toward the second stationary head 508C. As such, the first gap 510A increases in size, while the second gap 510B decreases in size. At the same time, the second rotatable head 508D moves toward the third stationary head 508E. As such, the third gap 510C increases in size, while the fourth gap 510D decreases in size. Further, the third rotatable head 508F moves toward the fourth stationary head 508G. As such, the fifth gap 510E increases in size, while the sixth gap 510F decreases in size. Finally, the fourth rotatable head 508H moves toward the first stationary head 508A. As such, the seventh gap 510G increases in size, while the eighth gap 510H decreases in size. The opposite occurs if the rotatable housing 506 rotates in a counterclockwise direction. As discussed above, the gaps between the stationary heads 508A, 508C, 508E, 508G and the rotatable heads 508B, 508D, 508F, 508H provide a hard stop that limits the amount of rotation of the flexure based torque sensor 500.

As the rotatable heads 508B, 508D, 508F, 508H move, the sensors 512A, 512B, 512C, and 512D detect the rotational movement of the rotatable heads 508B, 508D, 508F, 508H. As discussed above, the torque sensor 500 may include a processor configured to combine a first reading from the first sensor 512A, a second reading from the second sensor 512B, a third reading from the third sensor 512C, and a fourth reading from the fourth sensor 512D to determine a torque on the system. For example, the processor may be configured to add the values from the first reading and the third reading, and further add the values from the second reading and the fourth reading. In such an example, the combined sensor data may cancel out movements that are unrelated to measuring torque. For example, by adding the values from the first and third readings and the second and fourth readings, lateral and vertical movements will be cancelled out so that only rotational movements are detected. Further, as discussed above, the sensors 512A, 512B, 512C, and 512D may be configured to ignore bending moments such that only rotational movements are detected by the sensors. The processor may be further configured to normalize the first and third readings by dividing the added value by two. Similarly, the processor may be configured to normalize the second and fourth readings by dividing the added value by two. The processor may then be configured to add the two normalized values together, and divide the added normalized value by two. In another example, the processor may be configured to add the value from the first and third readings and the second and fourth readings, and divide the combined reading by four (since there are four sensor readings from sensors 512A, 512B, 512C, and 512D) to obtain the normalized torque. Other examples are possible as well.

Figure 6:
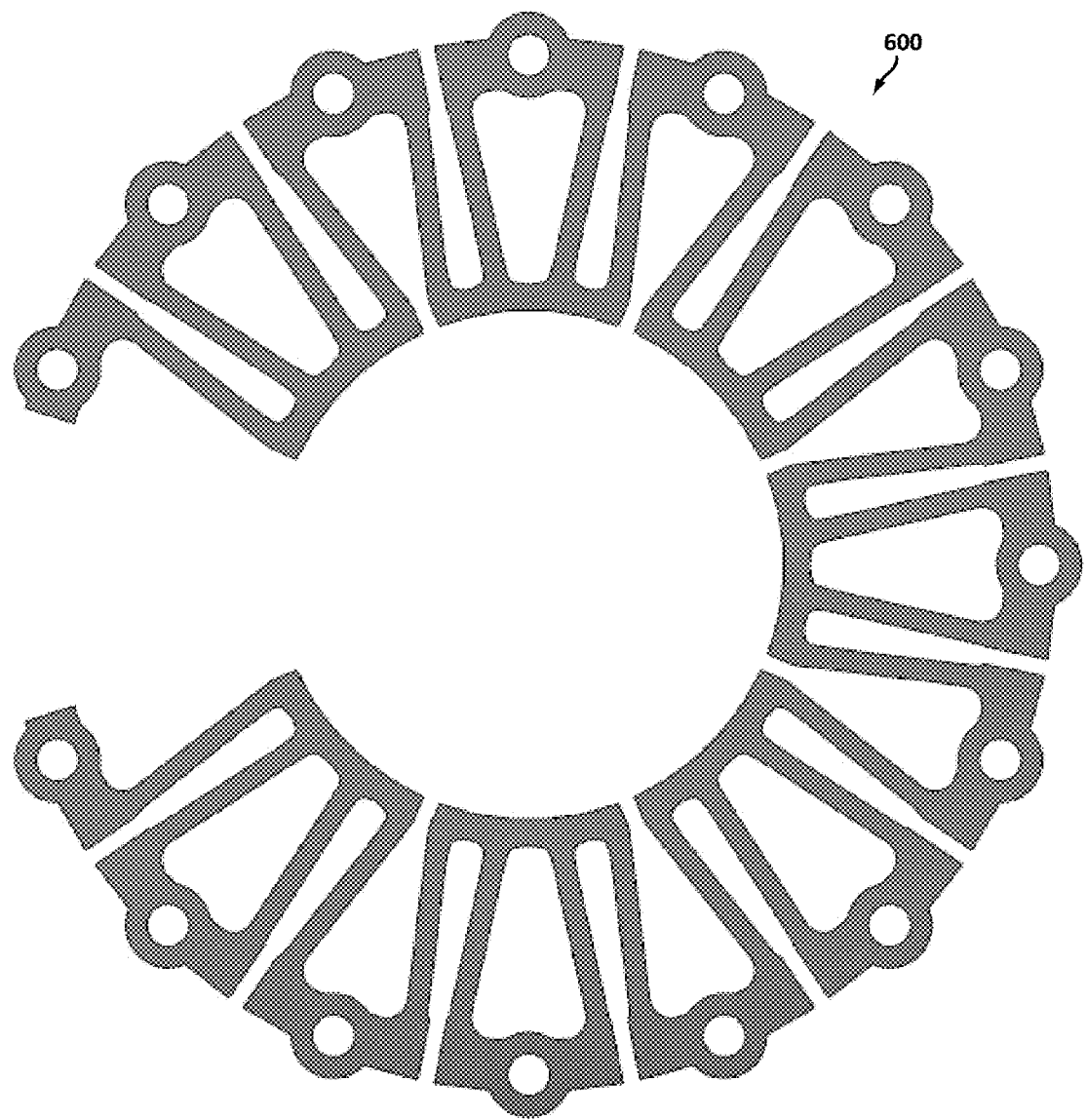
FIG. 6 illustrates another example flexure hub of an example torque sensor, according to an example implementation.

FIG. 6 illustrates another example flexure hub 600 of an example torque sensor, according to an example implementation. As shown in FIG. 6, the flexure hub does not have to be a complete circle. In yet another example, the flexure hub may include only two heads, a single rotatable head and a single stationary head. In such an example, the torque sensor may include a bearing system configured to cause the rotatable head to move in a circular path. Such a torque sensor would include a sensor positioned adjacent to the rotatable head, as discussed above.

Figure 7:
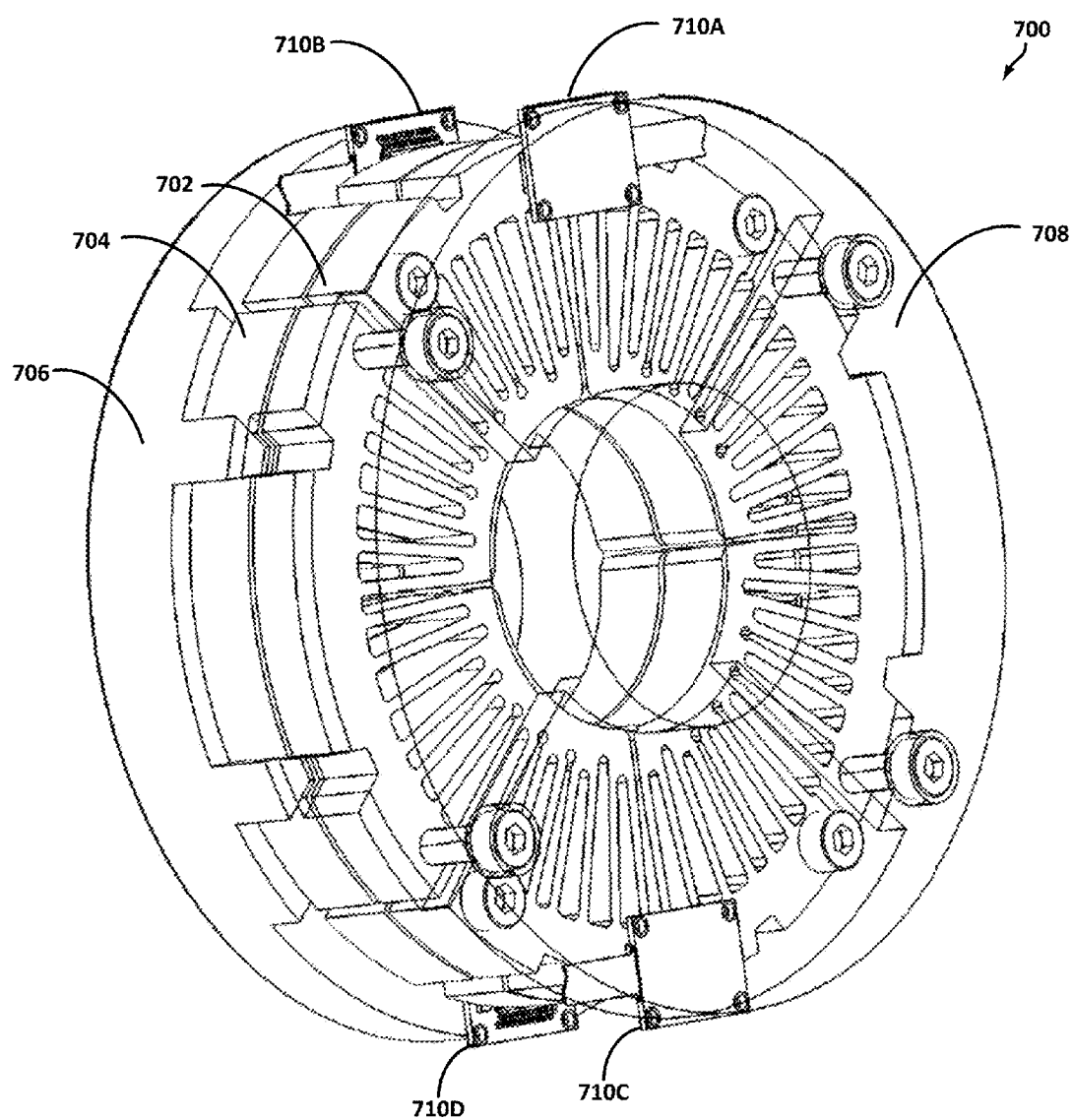
FIG. 7 illustrates another example torque sensor, according to an example implementation.

In yet another implementation, a torque sensor may include a plurality of individual annular flexure heads coupled to one another. Such an implementation may be used to detect various torque ranges with improved resolution. For example, as shown in FIG. 7, an example torque sensor 700 may include a first annular flexure hub 702 coupled to a second annular flexure hub 704. Each of the annular flexure hubs 702, 704 may be positioned between a stationary housing 706 and a rotatable housing 708. As shown in FIG. 7, the first annular flexure hub 702 and the second annular flexure hub 704 are four-headed flexure hubs, such as those described above in FIGS. 4A, 4B, 4C, and 4D. As such, each of the flexure hubs include two rotatable heads, and two stationary heads. However, alternative numbers of heads are possible as well, such as the eight-headed flexure hubs described above in relation to FIGS. 5A, 5B, 5C, and 5D.

The torque sensor 700 may further include a first sensor 710A positioned adjacent to a first rotatable head of the first annular flexure hub 702, a second sensor 710B positioned adjacent to a first rotatable head of the second annular flexure hub 704, a third sensor 710C positioned adjacent to a second rotatable head of the first annular flexure hub 702, and a fourth sensor 710D positioned adjacent to a second rotatable head of the second flexure hub 704. The sensors 710A, 710B, 710C, and 710D may be linear displacement sensors, angular displacement sensors, MR sensors, fluxgate magnetometers, or Hall effect sensors, as examples. Other examples are possible as well. Further, the sensors 710A, 710B, 710C, 710D may be positioned in a variety of ways on the various components of the torque sensor 700, as discussed above.

In one example, the first annular flexure hub 702 may be less stiff than the second annular flexure hub 704. For example, the first annular flexure hub 702 may be made of a different, less stiff material than the second annular flexure hub 704. In another example, the first annular flexure hub 702 may be thinner than the second annular flexure hub 704. As such, the first sensor 710A and third sensor 710C may detect torques of smaller magnitude than the second sensor 710B and fourth sensor 710D. In operation, as the rotatable housing 708 rotates, the first sensor 710A and third sensor 710C may detect the rotational movement of the rotatable heads of the first annular flexure hub 702. Once the gap between the rotatable heads and the stationary heads of the first annular flexure hub 702 closes, the rotatable heads of the second annular flexure hub 702 continues to move, and the second sensor 710B and fourth sensor 710D detect the rotational movement of the rotatable heads of the second annular flexure hub 702.

FIG. 8 illustrates a non-transitory computer-readable medium configured according to an example implementation. In example implementations, the example torque sensor may be in communication with one or more processors, one or more forms of memory, one or more input devices/interfaces, one or more output devices/interfaces, and machine-readable instructions that when executed by the one or more processors cause a robotic device to carry out various functions, tasks, capabilities, etc.

As noted above, in some implementations, the disclosed torque sensor can cause example robotic joints to perform actions that may be implemented by computer program instructions encoded on a non-transitory computer-readable storage media in a machine-readable format, or on other non-transitory media or articles of manufacture. FIG. 8 is a schematic illustrating a conceptual partial view of an example computer program product that includes a computer program for executing a computer process on a computing device, arranged according to at least some implementations presented herein.

In one implementation, the example computer program product 800 is provided using a signal bearing medium 802. The signal bearing medium 802 may include one or more programming instructions 804 that, when executed by one or more processors may provide functionality or portions of the functionality described above with respect to FIGS. 1-7. In some examples, the signal bearing medium 802 can be a computer-readable medium 806, such as, but not limited to, a hard disk drive, a Compact Disc (CD), a Digital Video Disk (DVD), a digital tape, memory, etc. In some implementations, the signal bearing medium 802 can be a computer recordable medium 808, such as, but not limited to, memory, read/write (R/W) CDs, R/W DVDs, etc. In some implementations, the signal bearing medium 802 can be a communications medium 810, such as, but not limited to, a digital and/or an analog communication medium (e.g., a fiber optic cable, a waveguide, a wired communications link, a wireless communication link, etc.). Thus, for example, the signal bearing medium 802 can be conveyed by a wireless form of the communications medium 810.

The one or more programming instructions 804 can be, for example, computer executable and/or logic implemented instructions. In some examples, a computing device such as the processor(s) 102 of FIG. 1 is configured to provide various operations, functions, or actions in response to the programming instructions 804 conveyed to the processor(s) 102 by one or more of the computer-readable medium 806, the computer recordable medium 808, and/or the communications medium 810.

The non-transitory computer-readable medium 806 could also be distributed among multiple data storage elements, which could be remotely located from each other. The device that executes some or all of the stored instructions could be a torque sensor including a computing device. In another example, the device that executes some or all of the stored instructions could be a robotic device including a computing device. Alternatively, the device that executes some or all of the stored instructions could be a cloud-based computing device in wireless communication with an example robotic device.

Within some examples herein, operations may be described as methods for performing functions, and methods may be embodied on a computer program product (e.g., a tangible computer readable storage medium or non-transitory computer readable medium) that includes instructions executable to perform the functions.

IV. Conclusion

Arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. Further, the terminology used herein is for the purpose of describing particular implementations only, and is not intended to be limiting.

We claim:

1. A device comprising:
    an annular flexure hub including a first stationary head, a second stationary head, a first rotatable head, and a second rotatable head, wherein each of the heads comprise an annular sector of the flexure hub, and wherein the first and second stationary heads are interleaved between the first and second rotatable heads;
    a stationary housing coupled to the first stationary head and the second stationary head of the flexure hub;
    a first sensor positioned adjacent to the first rotatable head of the flexure hub;
    a second sensor positioned adjacent to the second rotatable head of the flexure hub; and
    a rotatable housing coupled to the first rotatable head and the second rotatable head of the flexure hub.

2. The device of claim 1, further comprising:
    a first gap between the first stationary head and the first rotatable head at an outer circumference of the flexure hub;
    a second gap between the first rotatable head and the second stationary head at the outer circumference of the flexure hub;
    a third gap between the second stationary head and the second rotatable head at the outer circumference of the flexure hub; and
    a fourth gap between the second rotatable head and the first stationary head at the outer circumference of the flexure hub.

3. The device of claim 2, wherein a width of each of the first gap, the second gap, the third gap, and the fourth gap define a maximum rotation between the rotatable housing and the stationary housing.

4. The device of claim 1, wherein the first sensor and the second sensor are positioned adjacent to an outer circumference of the flexure hub.

5. The device of claim 1, further comprising:
    a processor configured to combine a first reading from the first sensor and a second reading from the second sensor to determine a torque on the device.

6. The device of claim 5, further comprising:
    a control system configured to control a rotational input to the rotatable housing based on the determined torque on the device.

7. The device of claim 1, wherein each of the first stationary head, the second stationary head, the first rotatable head, and the second rotatable head include respective pluralities of spokes.

8. The device of claim 1, further comprising:
    a first cutout in the first stationary head;
    a second cutout in the second stationary head;
    a first protrusion on the stationary housing configured to fit within the first cutout such that the stationary housing is coupled to the first stationary head; and
    a second protrusion on the stationary housing configured to fit within the second cutout such that the stationary housing is coupled to the second stationary head.

9. The device of claim 1, further comprising:
    an actuator coupled to the rotatable housing, wherein the actuator provides a rotational input to the rotatable housing.

10. The device of claim 1, wherein the first sensor and the second sensor comprise linear displacement sensors.

11. The device of claim 1, wherein the first sensor and the second sensor comprise angular displacement sensors.

12. The device of claim 1, further comprising:
    a third stationary head, a fourth stationary head, a third rotatable head, and a fourth rotatable head in the annular flexure hub, wherein each of the heads comprise an annular sector of the flexure hub, wherein the stationary housing is coupled to the third stationary head and the fourth stationary head of the flexure hub, and wherein the rotatable housing is coupled to the third rotatable head and the fourth rotatable head of the flexure hub such that the first, second, third, and fourth stationary heads are interleaved between the first, second, third, and fourth rotatable heads;
    a third sensor positioned adjacent the third rotatable head of the flexure hub; and
    a fourth sensor positioned adjacent the fourth rotatable head of the flexure hub.

13. The device of claim 1, wherein the first and second stationary heads are peninsulas of a single stationary component.

14. A robotic joint comprising:
a first limb;
a second limb; and
a torque sensor, wherein the torque sensor includes:
  an annular flexure hub including a first stationary head, a second stationary head, a first rotatable head, and a second rotatable head, wherein each of the heads comprise an annular sector of the flexure hub, and wherein the first and second stationary heads are interleaved between the first and second rotatable heads;
  a stationary housing coupled to the first stationary head and the second stationary head of the flexure hub, wherein the stationary housing is further coupled to the first limb;
  a first sensor positioned adjacent to the first rotatable head of the flexure hub;
  a second sensor positioned adjacent to the second rotatable head of the flexure hub; and
  a rotatable housing coupled to the first rotatable head and the second rotatable head of the flexure hub, wherein the rotatable housing is further coupled to the second limb.

15. The robotic joint of claim 14, further comprising:
a first gap between the first stationary head and the first rotatable head at an outer circumference of the flexure hub;
a second gap between the first rotatable head and the second stationary head at the outer circumference of the flexure hub;
a third gap between the second stationary head and the second rotatable head at the outer circumference of the flexure hub; and
a fourth gap between the second rotatable head and the first stationary head at the outer circumference of the flexure hub.

16. The robotic joint of claim 15, wherein a width of each of the first gap, the second gap, the third gap, and the fourth gap define a maximum rotation between the rotatable housing and the stationary housing.

17. A robotic device comprising:
a body;
one or more joints coupled to the body, wherein at least one of the one or more joints includes:
  a first limb;
  a second limb;
  a torque sensor, wherein the torque sensor includes (i) an annular flexure hub including a first stationary head, a second stationary head, a first rotatable head, and a second rotatable head, wherein each of the heads comprise an annular sector of the flexure hub, and wherein the first and second stationary heads are interleaved between the first and second rotatable heads, (ii) a stationary housing coupled to the first stationary head and the second stationary head of the flexure hub, wherein the stationary housing is further coupled to the first limb, (iii) a first sensor positioned adjacent to the first rotatable head of the flexure hub, (iv) a second sensor positioned adjacent to the second rotatable head of the flexure hub, and (v) a rotatable housing coupled to the first rotatable head and the second rotatable head of the flexure hub, wherein the rotatable housing is further coupled to the second limb; and
a controller programmable to (i) combine a first reading from the first sensor and a second reading from the second sensor to determine a torque on a given joint, and (ii) control a rotational input to the rotatable housing of the given joint based on the determined torque.

18. The robotic device of claim 17, wherein the torque sensor further includes:
a first cutout in the first stationary head;
a second cutout in the second stationary head;
a first protrusion on the stationary housing configured to fit within the first cutout such that the stationary housing is coupled to the first stationary head; and
a second protrusion on the stationary housing configured to fit within the second cutout such that the stationary housing is coupled to the second stationary head.

19. The robotic device of claim 17, wherein the first sensor and the second sensor comprise linear displacement sensors.

20. The robotic device of claim 17, further comprising:
an actuator coupled to at least one of the first limb and the second limb, wherein the controller is programmable to cause the actuator to provide the rotational input to the rotatable housing of the given joint.

* * * * *